Jan. 23, 1951     D. L. BLEITZ     2,539,342

PLATE OR CUT FILM HOLDER

Filed Nov. 6, 1947     2 Sheets-Sheet 1

Inventor
DONALD L. BLEITZ,
By J. Harold Kilcoyne
Attorney

Jan. 23, 1951   D. L. BLEITZ   2,539,342
PLATE OR CUT FILM HOLDER
Filed Nov. 6, 1947   2 Sheets-Sheet 2

Inventor
DONALD L. BLEITZ,
By
Attorney

Patented Jan. 23, 1951

2,539,342

UNITED STATES PATENT OFFICE 2,539,342

PLATE OR CUT FILM HOLDER

Donald L. Bleitz, Hollywood, Calif.

Application November 6, 1947, Serial No. 784,477

7 Claims. (Cl. 95—67)

This invention relates to plate or cut film holders and, with regard to its more specific aspects, to an improved light seal for maintaining such holders light-tight under all conditions of use.

It is well known to provide plate or cut film holders with means for sealing off the dark slide opening or openings of the holder against entrance of light to the sensitized plate or film mounted in the holder while the latter is being handled between dark room and camera, as well as in the interval between exposure and development. One popular form of light seal consists of an elongate strip of spring metal covered with light excluding material such as felt which normally extends across and closes the slide opening when the dark slides are withdrawn and which is depressed by the slide when the latter is introduced into the holder. This form of light seal has the disadvantage that if a slide is inserted "corner first," it depresses the spring member for a greater length than that covered by the slide, permitting light to leak past the edges of the slide. According to a more recent design of light seal, the spring member consists of a comb-like structure, that is, it incorporates a series of spring teeth which may depress individually whereby, even if the slide is inserted corner first, it will depress only the spring teeth covered by the inserted corner of the slide. While providing an effective solution for the particular problem, a light seal employing the comb or tooth form of spring member is expensive to manufacture and assemble, and it must also have precision fit in its holder to be completely effective.

Stated broadly, the present invention contemplates and aims to provide an improved form of light seal for plate and cut film holders which is equally effective as, but which may be inexpensively manufactured as compared to, the light seals or valves employing the comb-type spring member, and which is moreover capable of being readily incorporated in the holder by a simple and inexpensive assembly operation. More particularly, it is an object of the invention to provide a spring-actuated light seal for plate or cut film holders which incorporates as its spring member a single continuous length of spring wire which is so fashioned that when covered by an appropriate light excluding material and assembled in its holder, it forms an effective means for urging its light excluding covering into tight pressure contact with the holder cover plate, while at the same time having the property of depressing only for the length thereof that is positively acted upon by the dark slide or corners thereof. Yet another object of the invention is the provision of a light sealing means whose effective height is substantially less than that necessary for light seals or valves employing the aforementioned comb-like spring member, whereby a plate or film holder may be provided with double light seals adjacent its top opening or openings for the double sealing function achieved thereby, without substantially increasing the overall height of the holder. A still further object of the invention is to provide a light seal for the so-called double plate or cut film holders which employs a unitary spring member capable of sealing off both the front and rear openings for the two dark slides as conventionally employed in the double holder.

The above and other objects and advantages will be apparent from the following detailed description of and accompanying drawing illustrating a typical plate or cut film holder incorporating the improved light sealing means of the present invention, in which.

Figure 5:
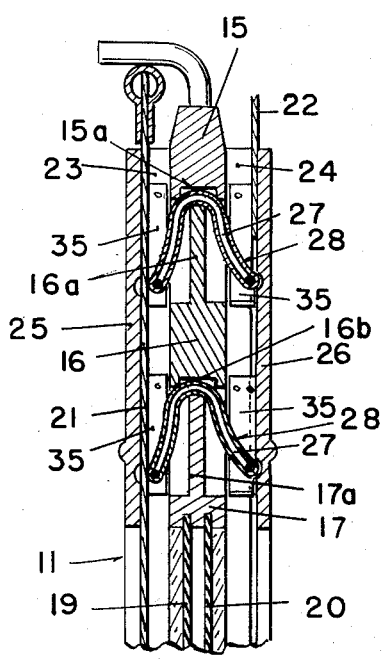
Fig. 5 is a section view taken through the holder on line 5—5 of Fig. 1, the view illustrating one slide fully inserted and the other in a preliminary stage of insertion in the holder.

Referring to the drawings, reference character 10 generally designates a plate or cut film holder of the double slide type which illustratively comprises vertical side frames 11, 12, a bottom cross bar 13 to which is hinged a plate or film retaining door 14, and a top cross bar 15 (Fig. 5). The holder side frames and bottom and top bars may be held together by tongue and slot connections as is conventional and, while the holder frame illustrated may be taken as made of wood selected for its anti-warping properties, it may also be made of metal or molded from plastic.

In the illustrated holder, supplemental upper and lower cross bars 16 and 17 are shown to extend across the top of the holder, being secured to the holder side frames 11, 12 as by a tongue and slot connection therewith. As seen in Fig. 5, the top edge of the upper bar 16 is spaced by a small amount from the lower edge of the top cross bar 15, and the top edge of the lower bar 17 is similarly slightly spaced from the lower edge of the intermediate cross bar 16. The function of the supplemental upper and lower cross bars 16 and 17 will appear in the following description.

The illustrated holder is of the double slide type, that is, it is capable of supporting two sensitized plates or films against the opaque center panels 19, 20, and of mounting two dark slides 21, 22 in covering relation to the so supported plates or films. It will be understood that the center panels 19, 20 and/or the holder side frames 11, 12 are formed or provided with the usual channels or grooves for receiving the edges of the plates or cut film inserted in the holder from the bottom end thereof.

The holder is also formed with conventional top slide openings 23, 24 provided for the insertion and withdrawal of the dark slides, and with the usual grooves (not shown) formed in the facing side edges of the holder side frames 11, 12 to receive and guide the slides during their insertion and withdrawal. As shown, the top openings may be defined in part by metal cover plates 25, 26 secured against the outer faces of the side frames adjacent the upper ends thereof, being preferably set into undercuts formed in the side frame faces.

Considering now the light sealing means for closing off the holder top openings 23, 24 against the entrance of light to the sensitized plates or cut film mounted in the holder, with which feature the invention is primarily concerned, it will be observed that according to the illustrated construction (Fig. 5) two light sealing means arranged one above the other are provided for the double light sealing function achieved thereby. However, the provision of two light sealing means is not essential as one such light sealing means may suffice, particularly for the smaller size holders, and hence it is to be understood that the invention is not limited to the use of double light seals as illustrated. It will be seen also that according to the invention each light sealing means provides two light-sealing valves or portions which together are capable of closing off both the front and rear holder top openings 23, 24, the double sealing function of a unitary sealing means resulting in economy in manufacture and also facilitating assembly of the holder as a whole.

Figure 1:
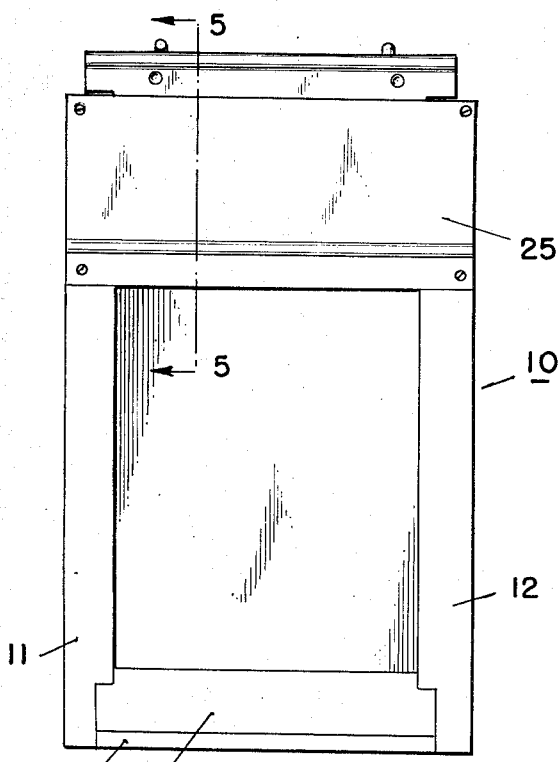
Fig. 1 is a plan view of a photographic holder as aforesaid incorporating the improved light sealing means of the present invention.
Figure 2:
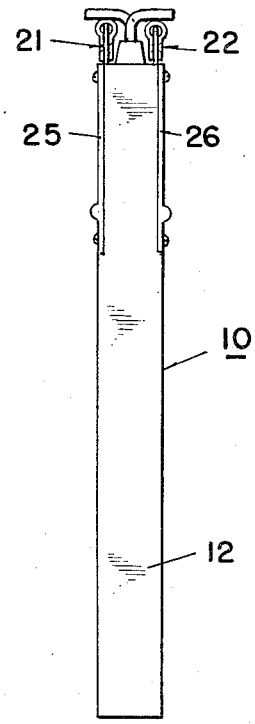
Fig. 2 is a side view of the holder illustrated in Fig. 1.
Figure 3:
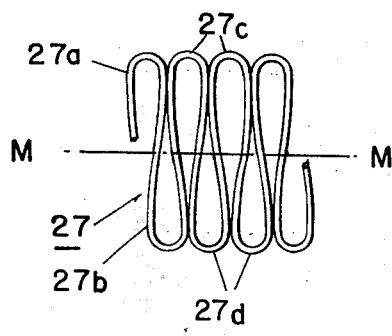
Figs. 3, 3A and 3B are detail views illustrating successive stages in the manufacture of the spring member of a light seal according to the invention.
Figures 3A, 3B:
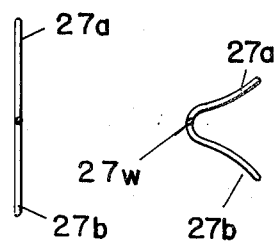

Referring more particularly to Figs. 3, 3A, 3B 4 and 5, each light sealing means is shown to consist essentially of a spring-actuating member 27 covered with a light excluding material 28, such as felt, of which the spring member functions to urge its light excluding covering against the inner faces of the holder cover plates 25, 26 and preferably into a depression formed in the inner faces thereof, as is usual. According to the invention, the spring member 27 is formed from a single continuous length of wire which in a preliminary operation is bent back and forth on itself to form a connected series of reversely disposed, contiguous loops 27a, 27b, 27c, etc. (Fig. 3). As seen in Fig. 3A, all said loops are contained in a common plane. In a subsequent working operation, the looped wire is folded on itself along its longitudinal middle line MM, so that in its final form it has inverted U-formation when viewed in end elevation, as in Fig. 3A. As further indicated in this figure, the legs of the resulting U-shaped spring member diverge by an angle approaching 90° from one another and are preferably curved or flared outwardly from the web or connecting portion 27w of the spring member to their free ends. The described arrangement results in a longitudinal series of spring wire loops disposed to the opposite sides of the spring member middle line MM, each loop of the two series thereof being capable of individual flexing action.

The free ends of the loops of the two longitudinal series thereof may be edged by a folded strip 30 of paper or pliable cardboard, and thereupon the spring member is enclosed within its covering 28 of light excluding material so as to be wholly contained within said covering. Preferably, the light excluding material is caused to adhere to the spring wire by coating either or both with a suitable adhesive or cement prior to applying the covering to the spring wire.

To assemble two such light sealing means as described in the illustrated double slide holder, one sealing means, i. e. spring member 27 and its light excluding covering properly assembled beforehand is simply disposed in the inverted position as shown in Fig. 5 between the top cross bar 15 and the supplementary upper bar 16, and a second sealing means is similarly disposed between said upper bar 16 and the supplementary lower bar 17. Said bars are now brought together prior to their being connected to the holder side frames, so that they clamp the web or middle portions of the sealing means therebetween. Upon final assembly of the cross bars with the holder side frames 11, 12, each sealing means is firmly secured astride its cross member and in position such that its spring leg portions depend to opposite sides from its clamped middle portion. Due to the angle of inclination of the said leg portions, and also to their spring construction, the free ends of the sealing means tend to bear with substantial spring pressure against the inner faces of the holder cover plates 25, 26, being freely depressible by the slides upon their introduction into the holder.

To facilitate proper location of the sealing means, as well as to insure effective clamping action of the cross bars thereof, the bottom edge of the top cross bar 15 is formed with a downwardly opening channel 15a and the upper edge portion of the supplementary cross bar 16 is formed as an upstanding rib 16a. Similarly, the lower edge of the cross bar 16 is formed with a channel 16b and the upper edge portion of the supplementary lower cross bar 17 is formed as an upstanding rib 17a. With the ribs 16a, 17a extending into and supporting the U-shaped sealing means in the inverted position as shown, and with the middle portion of the sealing means extending to a degree into the channels 15a, 16b, the operation of bringing together the cross bars 15, 16 and 17 will effect clamping action of cross bars on sealing means, which clamping action is fully maintained during the life of the holder.

In the illustrated holder, it is contemplated that the length of each sealing means is greater than the width of the dark slides, and that the extending ends of the sealing means seat in appropriately shaped recesses formed in the facing edges of the holder side frames 11, 12, as is well known. Accordingly, light is effectively prevented from passing into the holder at the corners thereof, either through the grooves provided in the side frames for the reception of the slides or along the edges of the slides, as well as along the faces of the slides.

In the construction so far described, it will be observed that a single light sealing means consisting of a continuous looped-wire spring member and its fabric of felt covering functions to seal off both of the holder top openings provided in a so-called double holder which supports two sensitized plates or films. The economy of such a double-acting sealing device, as compared with light seals or traps employing a separate spring member for each slide opening, taken with the ease and simplification of its assembly in a holder, represent distinct features of advantage over the prior holders. An added advantage of the use of a light sealing member of generally U-formation as herein disclosed is that the depth of the light sealing member is substantially less than that necessary for light seals or valves of the type employing spring members individual to each dark slide opening and which are individually secured, generally along their top edges. Accordingly, two light sealing means of the type contemplated by the present invention may be employed in a holder without substantially increasing the overall height thereof.

Figure 6:
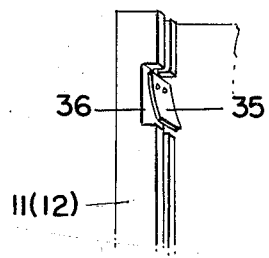
Figs. 6 and 7 are detail views illustrating a means of sealing the holder top corners against the entrance of light along the side edges of the slide.
Figure 7:
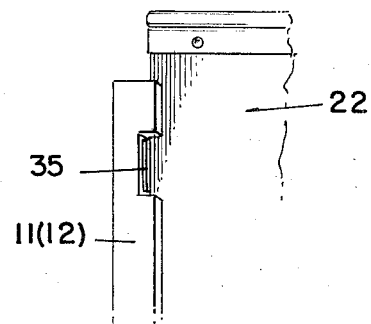
Figure 4:
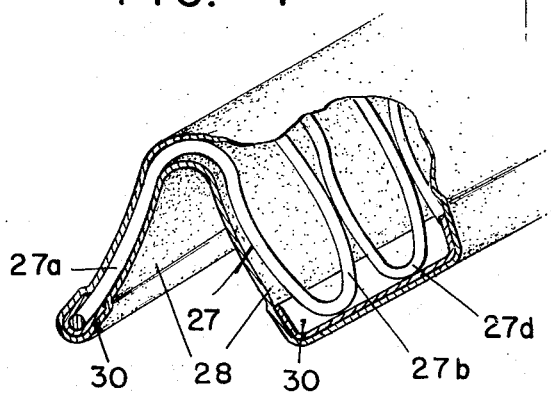
Fig. 4 is an enlarged detail view of the improved light seal, the light excluding spring covering being cut away to expose portions of the spring member thereof.

In the event that the edge or corner sealing as results from the extension of the light-sealing means beyond the side edges of the dark slides is insufficient for the extremely fast film of modern manufacture, additional edge sealing means may be incorporated. Referring to Fig. 6, such additional edge sealing means may comprise small individual leaf springs 35 set into recesses 36 provided in the holder side frames 11 and 12 adjacent the top corners of the holder, so that they normally extend across the grooves or channels provided to receive the edges of the dark slide, and thus function as light seals preventing entrance of light through said grooves. As a dark slide is inserted, these springs are engaged by the edges thereof and are depressed as shown in Fig. 7. If desired, the springs 35 may be faced with a light excluding material such as fabric or felt.

Without further analysis, it will be appreciated that the light sealing means of the present invention possesses all of the advantages of prior light seals or valves employing a comb-like spring member, while at the same time provides a light seal which may be inexpensively manufactured and readily assembled. Due to the construction of the spring member from looped wire, each loop of a longitudinal series thereof acts independently of contiguous loops, with the result that one loop may depress independently of the next adjacent loops, as for example when a dark slide is inserted corner-first. Accordingly, the light sealing means of the invention will depress only for the length of the wire loops which are individually acted upon by an entering dark slide.

As many changes could be made in carrying out the above constructions without departing from the scope of the invention, it is intended that all matter contained in the foregoing description or shown in the accompanying drawings shall be interpreted as illustrative and not in a limiting sense.

I claim:

1. In a photographic holder for plate and cut film, a frame including a spaced top cross bar and two supplementary upper cross bars and having top openings for the insertion of front and rear dark slides, and two spring-actuated light sealing means disposed one above the other and each operative to seal both the front and rear openings against the entrance of light to the holder, each light sealing means including a U-shaped spring member consisting of a continuous length of spring wire bent back and forth on itself to provide two angularly related, longitudinally extending series of individually acting spring loops which extend across the width of an opening, one of said light sealing means being positioned astride each of the supplementary upper cross bars, the uppermost sealing means being clamped between the top and uppermost supplementary cross bars, and the lower sealing means being clamped between the supplementary cross bars.

2. In a photographic plate or cut film holder having a dark slide receiving slot opening through the end of the holder, and a dark slide adapted for insertion in and removal from said slot, a light seal mounted in said holder adjacent the open end of the slot and extending across said slot to close the same against entry of light, said light seal including spring means comprising a series of individually acting, contiguous spring wire loops, and means for securing said loops in the holder along one longitudinal side of the slot so that the closed ends of the loops extend in inclined relation across said slot and resiliently press said seal against the other longitudinal side thereof.

3. In a photographic plate or cut film holder having a dark slide receiving slot opening through the end of the holder, and a dark slide adapted for insertion in and removal from said slot, a light seal mounted in said holder adjacent the open end of the slot and extending across said slot to close the same against entry of light, said light seal including spring means comprising a continuous length of spring wire constructed and arranged so as to provide a running series of individually acting, contiguous spring loops, and means for mounting said spring means along one longitudinal side of the slot so that the closed ends of the loops extend in inclined relation across said slot and resiliently press said seal against the other longitudinal side thereof.

4. In a photographic plate or cut film holder having a dark slide receiving slot opening through the end of the holder, and a dark slide adapted for insertion in and removal from said slot, a light seal mounted in said holder adjacent the open end of the slot and extending across said slot to close the same against entry of light, said light seal including spring means comprising a continuous length of spring wire constructed and arranged so as to provide two running series of reversely disposed, individually acting, contiguous spring loops, and means for mounting the spring means in the holder so that the loops of at least one series thereof extend in inclined relation from one longitudinal side of and across said slot and resiliently press said seal against the other longitudinal side thereof.

5. In a photographic plate or cut film holder of the double slide type having a pair of dark slide receiving slots opening through an end of the holder, and a pair of dark slides adapted for individual insertion in and removal from said slots, the frame including spaced cross bars disposed between said slots adjacent their open ends, a single light sealing means extending across both said slots to close the same against entry of light and being positioned astride one of said cross bars and clamped thereto by the other cross bar, said sealing means incorporating spring means comprising a single length of wire bent and folded on itself to provide two running series of individually acting spring loops which are oppositely disposed to the sides of said one cross bar and extend in inclined relation across the width of the slots to resiliently press said sealing means against the outer longitudinal sides of said slots.

6. In a photographic plate or cut film holder of the double slide type having a pair of dark slide receiving slots opening through an end of the holder, and a pair of dark slides adapted for individual insertion in and removal from said slots, the frame including spaced cross bars disposed between said slots adjacent their open ends, a single light sealing means extending across both said slots to close the same against entry of light and being positioned astride one of said cross bars and clamped thereto by the other cross bar, said sealing means incorporating spring means comprising a single length of wire bent back and forth on itself to provide two running series of reversely disposed loops, each series of loops extending from the side of said one cross member across the width of a slot and pressing the sealing means against the outer side of said slot.

7. In a photographic plate or cut film holder of the double slide type having a pair of dark slide receiving slots opening through an end of the holder, and a pair of dark slides adapted for individual insertion in and removal from said slots, the frame including spaced cross bars disposed between said slots adjacent their open ends, a single light sealing means extending across both said slots to close the same against entry of light thereto and being positioned astride one of said cross bars and clamped thereto by the other cross bar, said sealing means incorporating spring means comprising a continuous length of spring wire bent on itself to provide two longitudinal series of individually acting spring loops and folded along its middle line between said series so that the loops of each series extend outwardly from said one cross bar and downwardly across the width of the slot, whereby said spring means resiliently press the sealing means against the outer sides of the slots.

DONALD L. BLEITZ.

REFERENCES CITED

The following references are of record in the file of this patent:

UNITED STATES PATENTS

| Number | Name | Date |
| --- | --- | --- |
| 658,974 | Bull | Oct. 2, 1900 |
| 773,382 | Folmer | Oct. 25, 1904 |
| 851,281 | Drake | Apr. 23, 1907 |
| 925,895 | Goddard | June 22, 1909 |
| 2,056,144 | Roth | Sept. 29, 1936 |
| 2,344,951 | Smith | Mar. 28, 1944 |
| 2,450,841 | Moore | Oct. 5, 1948 |

FOREIGN PATENTS

| Number | Country | Date |
| --- | --- | --- |
| 875,733 | France | June 29, 1942 |